United States Patent
Deschamps et al.

(10) Patent No.: US 6,641,497 B2
(45) Date of Patent: Nov. 4, 2003

(54) EPICYCLIC TRANSMISSION FOR ZERO TURNING RADIUS VEHICLES

(75) Inventors: Joseph P. Deschamps, Franklin, TN (US); James F. Peterson, Franklin, TN (US)

(73) Assignee: Murray, Inc., Brentwood, TN (US)

( * ) Notice: Subject to any disclaimer, the term of this patent is extended or adjusted under 35 U.S.C. 154(b) by 3 days.

(21) Appl. No.: 10/013,640

(22) Filed: Dec. 7, 2001

(65) Prior Publication Data

US 2003/0109345 A1 Jun. 12, 2003

(51) Int. Cl.[7] ................ F16H 37/02; B62D 11/02
(52) U.S. Cl. ................ 475/26; 475/28; 475/216
(58) Field of Search .............. 475/26, 28, 214, 475/215, 216

(56) References Cited

U.S. PATENT DOCUMENTS

| 4,641,548 | A | * | 2/1987 | Greenwood | ............ | 475/26 |
| 4,922,788 | A | * | 5/1990 | Greenwood | ............ | 475/26 |
| 5,074,830 | A | * | 12/1991 | Perry | ............ | 475/216 |
| 5,921,882 | A | * | 7/1999 | Hoge et al. | ............ | 475/215 |

FOREIGN PATENT DOCUMENTS

GB      2119328 A   *   11/1983

* cited by examiner

*Primary Examiner*—Ankur Parekh
(74) *Attorney, Agent, or Firm*—Kevin E. Joyce

(57) ABSTRACT

A drive shaft rotated by a drive gear is coupled to an epicyclic gear arrangement which is rotatable as a unit about the drive shaft's longitudinal axis, as well as about its own axis. A driven gear is rotatably mounted drive shaft between the drive gear and the gear arrangement. Facing surfaces of the drive and driven gears are provided with annular concavities. A pivotally adjustable friction disk extends between, and in contact with, the concave surfaces. The opposite side of the driven gear is operatively connected to the gear arrangement. When the drive shaft is rotated, the gear arrangement is rotated about its own axis in response to drive shaft rotation and is rotated about the drive shaft's axis in accordance with the position of the friction disk. The speed and direction of the wheel-driving output are thus controlled.

4 Claims, 1 Drawing Sheet

EPICYCLIC TRANSMISSION FOR ZERO TURNING RADIUS VEHICLES

BACKGROUND OF THE INVENTION

1. Field of the Invention

The present invention relates to an epicyclic transmission particularly suited for driving zero turning radius vehicles.

2. Prior Art

Steering control for numerous vehicles depends on the difference of speed which can be obtained between two drive wheels. When turning, the inner wheel rotates more slowly than the outer wheel. Vehicles that can turn about a point midway between the two drive wheels are classified as zero turning radius (ZTR) vehicles. Such turning is accomplished by one drive wheel rotating in a forward direction as fast as the other drive wheel rotates in the reverse direction.

A commnonly used arrangement for achieving a zero turning radius is employing a hydraulic motor and an associated vehicle displacement pump for hydraulically driving each wheel of a ZTR vehicle, such as a riding-type lawn tractor. However, hydraulic systems have disadvantages such as flow problems and leakage loss which affect efficiency. Also, pressure pulses can occur in hydraulic systems causing noise.

SUMMARY OF THE INVENTION

The present invention overcomes the above-noted deficiencies resulting in a quiet transmission not requiring the precision components necessary for a hydraulic system.

The invention is an epicyclic transmission capable of use in a zero turning radius vehicle. A drive shaft is coupled to a wheel-driving output through an epicyclic gear arrangement which, as a unit, is capable of rotation about a longitudinal axis of the drive shaft while also rotating about its own axis which extends transverse to the drive shaft's axis. A drive gear is joined to the drive shaft for rotation therewith. A driven gear is mounted on the drive shaft but is rotatable independently of the shaft's rotation. The driven gear is operatively joined to the epicyclic gear arrangement. Facing surfaces of the drive and driven gears are provided with annular concavities. A friction disk extends between the concave surfaces of the facing gears. The disk is pivotally adjustable so as to adjust the locations along the concave surfaces which are engaged by the disk. Rotation of the drive gear is translated by the disk to control the speed and the direction of rotation of the driven gear dependent on the disk's position. When the driven gear is rotated at a different speed than the drive gear, the driven gear imparts forces on the epicyclic gear causing it to rotate about the drive shaft's axis at the same time the epicyclic gear rotates about its own axis. Such compound movement of the epicyclic gear permits the speed and direction of the wheel-driving output to be controlled as a function of the position of the friction disk.

BRIEF DESCRIPTION OF THE DRAWING

The invention now will be described in greater detail with respect to the accompanying drawing which represents a cross-sectional view of a preferred embodiment of the invention.

DETAILED DESCRIPTION OF A PREFERRED EMBODIMENT OF THE INVENTION

Figure 1:
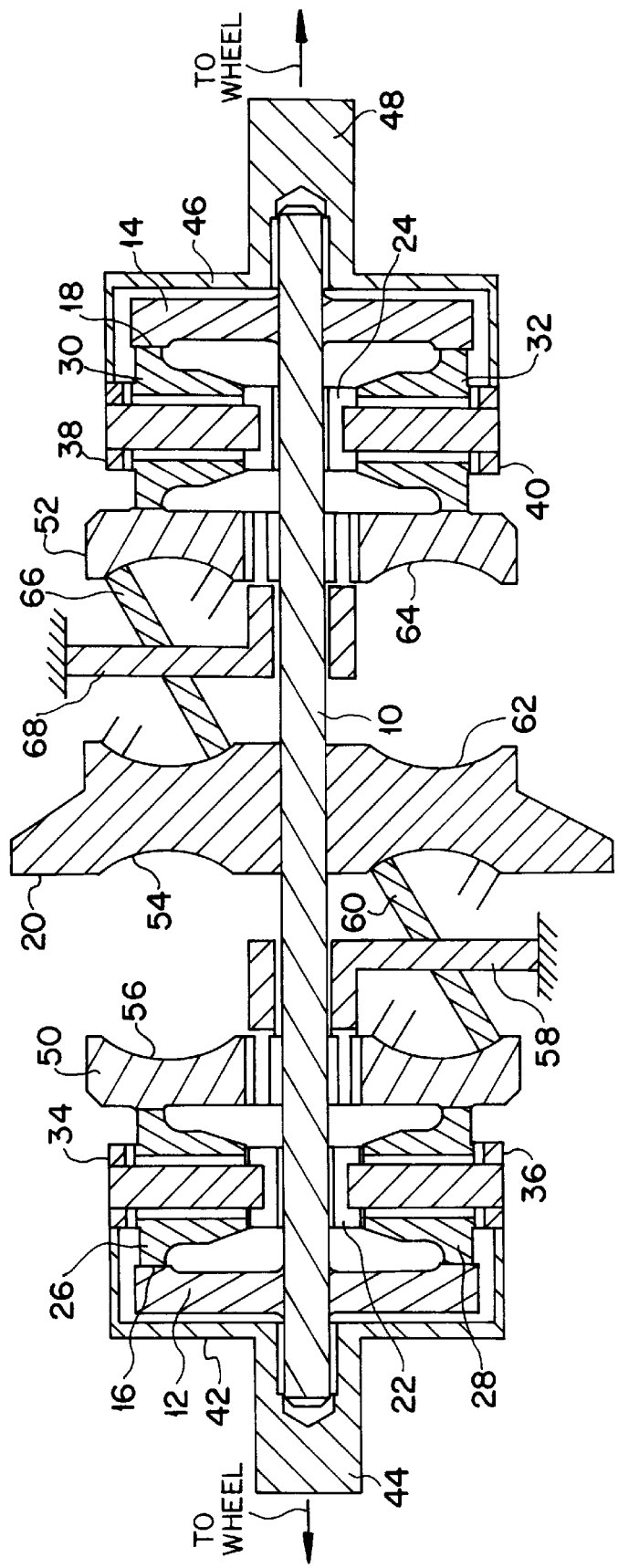

Referring now to the drawing, a central drive shaft 10 is provided at its opposite ends with bevel gears 12 and 14 having toothed surfaces 16 and 18, respectively. A drive gear 20 is secured to shaft 10 intermediate its ends. Gear 20 is driven by a powered input (not shown) for rotation of the shaft 10 and the bevel gears 12 and 14.

Near each end of shaft 10, in positions adjacent gears 12 and 14, bearings 22 and 24 are provided. The bearing 22 rotatably supports the ends of axially aligned pinion gears 26 and 28. Similarly, bearing 24 supports correspondingly arranged pinion gears 30 and 32. Gears 26 and 28 engage the teeth provided on the surface 16 of bevel gear 12, while gears 30 and 32 engage the teeth on surface 18 of bevel gear 14.

Each of the pinion gears is further supported by a respective concentrically arranged connector pin, the pins each comprising a shaft portion and a head. The shaft portions of pins 34, 36, 38 and 40 are retained within bearings in their respective pinion gears so that the pinion gears can rotate relative to their associated pins. The bearing-retained shaft portion of pin 34 supports pinion gear 26; that of pin 36 supports pinion gear 28; that of pin 38 supports pinion gear 30; and that of pin 40 supports pinion gear 32. The heads of pins 34 and 36 are secured to a cup-shaped drive cup 42 which is concentrically aligned with the longitudinal axis of drive shaft 10. A stub shaft 44 projecting from drive cup 42 is joined to a drive wheel (not shown) of a vehicle. Similarly, another drive cup 46 provided at the opposite end of shaft 10 is secured to the head portions of pins 38 and 40. Drive cup 46 also has a projecting stub shaft 48. Shaft 48 is connected to a second drive wheel (not shown) of the vehicle.

On opposite sides of drive gear 20, driven gears 50 and 52 are secured to bearings mounted on drive shaft 10. Thus, gears 50 and 52 are rotatable relative to shaft 10. The gears 50 and 52 are each provided with a toothed surface. The toothed surface of gear 50 engages the teeth of pinion gears 26 and 28, and the toothed surface of gear 52 engages the teeth of pinion gears 30 and 32.

A concave annular surface 54 is provided on one side of drive gear 20. The surface of driven gear 50 facing the drive gear 20 also is provided with an annular concavity 56. A bearing support 58 is positioned between gears 20 and 50. A friction disk 60 is pivotally connected to support 58 so as to extend in contacting relationship between surfaces 54 and 56. An operator control (not shown) is joined to disk 60 so as to locate the edge of the disk in contacting relationship with the concave surfaces 54 and 56 at desired positions.

A similar arrangement is provided between drive gear 20 and driven gear 52. Gears 20 and 52 are provided with facing annular concave surfaces 62 and 64 between which a friction disk 66 extends, the disk being pivotally connected to a further bearing support 68 positioned between gears 20 and 52. As in the case of disk 60, disk 66 is joined to an operator control (not shown) so that the location where the disk's edge contacts the concave surfaces of gears 20 and 52 can be selected.

The purpose of the friction disks will be described with respect to the arrangement of disk 60 between drive gear 20 and driven gear 50. It will be understood that this description also is applicable to the disk 66 associated with gears 20 and 52.

With the disk 60 disposed in a plane parallel to the longitudinal axis of the drive shaft 10, drive gear 20, driven gear 50 and bevel gear 12 are rotated at the same speed. However, gears 50 and 12 rotate in opposite directions. Since gears 50 and 12 are positioned on opposite sides of pinion gears 26 and 28, the pinion gears merely rotate about their common rotational axis which remains stationary.

Thus, drive cup 42 is not rotated, and no rotation is imparted to the first drive wheel. However, as disk 60 is pivoted so that its plane is angularly related to the drive shaft's longitudinal axis, the relative speed between drive gear 20 and driven gear 50 changes. Depending on the direction and degree of pivoting of the disk relative to the drive shaft's longitudinal axis, the driven gear 50 is rotated either faster or slower than the drive gear at the same time that the bevel gear 12 is being rotated by drive shaft 10 at the same speed and in the same direction as the drive gear 20. The differences in speed and direction of rotation of bevel gear 12 and the driven gear 50 result in forces being applied to the pinion gears 26 and 28 causing them to rotate as a unit about the axis of drive shaft 10 at the same time they are rotating about their own axes. This movement is translated to the stub shaft 44 so as to cause the speed and direction of the vehicle's first drive wheel to be controlled as a function of the position of disk 60.

When both disks 60 and 66 are appropriately manipulated by an operator, the respective drive wheels of the vehicle can be rotated at different speeds and in different directions. This capability permits the vehicle to be driven with a zero turning radius.

Although the embodiment which has been described with respect to its use with a zero turning radius vehicle, it will be understood that it can be used in other types of vehicles where it is desirous to rotate the drive wheels at different speeds and/or direction.

The embodiment described above employs a single drive shaft 10 with duplicate arrays of components provided on opposite sides of a drive gear to achieve the desired results. However, it is apparent that such an arrangement could be split into two transmissions utilizing a separate drive shaft for each wheel. Also, instead of using pinion gears, it is possible to employ planetary differential gearing.

What is claimed is:

1. An epicyclic transmission for controlling the speed and direction of rotation of a vehicle wheel, comprising:
    a drive shaft having an axis of rotation;
    a drive gear joined to the drive shaft for imparting rotation to the drive shaft about said axis;
    a gear arrangement mounted on the drive shaft, said gear arrangement including at least one pinion gear rotatable about both the axis of rotation of the drive shaft and about its own rotational axis;
    a driven gear mounted on the drive shaft between said drive gear and the gear arrangement in operative relationship with the gear arrangement, said driven gear being rotatable about said axis of rotation of the drive shaft independently of rotation of the
    drive shaft, said drive and driven gears having surfaces facing one another provided with respective concavities therein;
    a pivotally adjustable disk having an edge contacting the drive and driven gears within the concavities for controlling the speed and direction of rotation of the driven gear in accordance with the position of the disk;
    an additional gear joined to the drive shaft for rotation therewith, said additional gear being positioned in operational relationship with the gear arrangement on an opposite side of the gear arrangement from the driven gear; and
    a connector element associated with said gear arrangement, said connector element comprising a pin having a shaft positioned along the rotational axis of the pinion gear and about which shaft the pinion gear rotates, said pin being joined to the wheel-driving output element to translate rotation of the gear arrangement about the axis of rotation of the drive shaft to rotation of the wheel-driving output element.

2. A transmission according to claim 1, wherein when said disk is positioned in a plane parallel to the axis of rotation of the drive shaft, the gear arrangement rotates only about its rotational axis.

3. A transmission according to claim 1, wherein when said disk contacts the drive gear at a location closer to the axis of rotation of the drive shaft than where the disk contacts the driven shaft, the gear arrangement rotates about the axis of rotation of the drive shaft in a first direction as well as about its rotational axis, and wherein when said disk is in a position in which the disk contacts the drive gear at a location farther away from the axis of rotation of the drive shaft than where the disk contacts the driven shaft, the gear arrangement rotates about the axis of rotation of the drive shaft in an opposite direction as well as about its rotational axis.

4. A transmission according to claim 1, wherein said gear arrangement comprises at least two pinion gears each associated with a respective connecting element comprising a pin having a shaft positioned along an aligned axis of rotation of said at least two gears, the said at least two gears being rotatable about their respective pin shafts; and wherein said connecting elements are joined to the wheel-driving output element.

* * * * *